3,232,775
PREVENTION OF HYDRATION IN MAGNESIA REFRACTORIES
Ben Davies, Pittsburgh, and George R. Henry, Bethel Park, Pa., assignors to Harbison-Walker Refractories Company, Pittsburgh, Pa., a corporation of Pennsylvania
No Drawing. Filed Oct. 29, 1963, Ser. No. 319,679
8 Claims. (Cl. 106—58)

This invention relates to promoting hydration resistance for size graded refractory specialty mixtures, which include a high proportion of high purity magnesia in the fine or —65 mesh fraction. In a particular embodiment, the invention relates to an improved bonding complex for unfired basic refractory specialties, which include a high percentage of high purity magnesia in the fines.

Magnesia is notoriously susceptible to hydration upon exposure to the atmosphere. It also has a tendency to cause bloating and swelling when used with an aqueous tempering media. This tendency to hydrate is particularly distressing to the refractories industry, which uses large quantities of magnesia in the manufacture of basic refractory specialties. It is even more pronounced with the high purity, dead burned, synthetic magnesia which is used today. By high purity, we mean containing at least about 90% MgO, by weight and on the basis of an oxide analysis, and preferably above about 95%. By synthetic, we mean recovered from brines, bitterns, sea water or the like.

Accordingly, it is an object of this invention to provide an improved hydration preventing bonding system, for size graded refractories specialties which include a high percentage of finely divided high purity magnesia.

Briefly, according to one aspect of the invention, a bonding system is provided for a size graded refractory batch. The bonding system is comprised of about 0.5 to 5% of ball clay, about .25 to 1% of sodium formate, about 1 to 5% of a combination of two or more sodium silicates in any proportion yielding a combined $SiO_2$ to $Na_2O$ ratio of between 2 and 3.2 to 1. The ball clay is all less than 44 microns. The sodium formate is technical grade and is granulated preferably to a sizing of —100 mesh. The sodium silicate is essentially —65 mesh.

From 10 to 40% of the size graded refractory batch is —65 mesh dead burned magnesia of at least about 95% MgO content, and in which more than 50% of the —65 mesh magnesia passes a 325 mesh screen. The coarse +65 mesh fraction of the size graded batch may be comprised of almost any compatible refractory aggregate. Examples are calcined Alabama bauxite, calcined diaspore, kyanite, zircon, silicon carbide, Transvaal and Philippine chrome ore, olivine, refractory aluminas, etc.

The following examples, which are given by way of explanation and not by way of limitation, more particularly point out the best modes now known to use for the practice of this invention. All parts and percentages are by weight, unless otherwise specifically stated. All chemical analysis are on the basis of an oxide analysis, in conformity with the conventional practices of reporting the chemical content of refractory materials. All analyses should be considered but typical. All size grading is according to the standard Tyler series.

*Example I*

A refractory batch mixture was prepared, which consisted essentially of a dead burned magnesite of about 94.8% MgO. The remainder of this magnesite was about 2.8% $SiO_2$, about 0.3% $Al_2O_3$, about 0.6% $Fe_2O_3$ and about 1.5% CaO. The batch sizing was substantially as follows: 40% 3½ on 8 mesh, about 27% —8+28 mesh, the remainder passing 28 mesh. Of that portion passing a 28 mesh screen, about 95% passed a 65 mesh screen. Of that portion passing the 65 mesh screen, 60% passed a 325 mesh screen. This —65 mesh fraction can be termed "super ball mill fines." To this batch was added 2% of ball clay, 1.5% of sodium silicate having a silica to soda ratio of 3.2 to 1, 11.5% of sodium silicate having a silica to soda ratio of 2 to 1 (all —65 mesh), and about 0.75% of sodium formate. The batch was tempered with about 6%, by weight, of water, based on the total dry solids in the batch. The batch had good flow and was easily cast. Shapes made from this batch were placed in an autoclave, and subjected to steam at a pressure of 80 p.s.i. for about one hour. The shapes were apparently unaffected. This established hydration resistance for the shapes.

*Example II*

A good batch can consists entirely of a dead burned magnesite analyzing 98% MgO, about 0.6% $SiO_2$, about 0.3% $Al_2O_3$, about 0.3% $Fe_2O_3$, about 0.6% CaO, the remainder being loss on ignition. The sizing of the batch is identical to Example I, above. A bonding complex of about 1% of ball clay, about 3% of sodium silicate having a soda:silica ratio of about 1 to 3.2, about 2% of sodium silicate having a soda:silica ratio of about 1 to 2, and about 0.5% of sodium formate is added to the batch. 7% water is used as the tempering agent.

Generally, no more than about 8%, by weight, of water can be added to the specialty refractories of this invention, with about 6 to 7% being considered optimum. Optimum results are obtained when the ball clay addition is about 2%, when the sodium formate addition is between 0.5 and 0.75%, and when the combined sodium silicates are about 3%, all parts by weight.

From 10 to 40% of the batch of this invention is dead burned magnesia. This magnesia is all —65 mesh, and at least 50% should be —325 mesh ("super ball mill fine magnesia"). When we say "at least 50%" we intend to include 100% of the magnesia passing a 65 mesh screen also passing a 325 mesh screen. However, we caution that as —325 mesh magnesia approaches 40% of the total batch weight, the batch tends to set up very rapidly.

Having thus described the invention in detail and with sufficient particularity as to enable those skilled in the art to practice it, what is desired to have protected by Letters Patent is set forth in the following claims.

We claim:
1. In unconsolidated, unfired, refractory specialties, consisting of a size graded batch mixture of dry refractory particles and in which from 10 to 40%, by weight, thereof is super ball mill fine dead burned magnesia of at least about 90% MgO content, the improvement which comprises the following to promote resistance to hydration and increased strength:
 (a) from 1 to 5% of a combination of at least two sodium silicates having a combined silica:soda ratio of about between 2 and 3.2 to 1,
 (b) from 1 to 5% of ball clay,
 (c) from 0.25 to 1% of sodium formate.
2. A batch according to claim 1 which contains the following:
 (a) about 1.5% of sodium silicate having a silica:soda ratio of 3.2 to 1,
 (b) about 1.5% of sodium silicate having a silica:soda ratio of 2:1,
 (c) about 2% of ball clay and about 0.5 to 0.75% of the sodium formate.
3. The batch mixture of claim 1 in which the refractory particles are substantially all dead burned magnesia of at least about 95% MgO content.
4. The batch of claim 1 in which more than 50% of the super ball mill fine dead burned magnesia is —325 mesh in size.

5. The batch of claim 3 in which a substantial portion of the refractory particles rest on an 8 mesh screen.

6. In size graded refractory batches for making refractory shapes and in which from 10 to 40%, by weight, thereof is high purity ball mill fine dead burned magnesia, the improvement comprising the following to promote resistance to hydration and increased strength:
   (a) from 1 to 5% of a combination of at least two sodium silicates having a combined silica:soda ratio of about between 2 and 3.2 to 1,
   (b) from 1 to 5% of ball clay,
   (c) from 0.25 to 1% of sodium formate, 7. In methods of preparing size graded refractory batches for making refractory shapes, which batches include from 10 to 40%, by weight, of high purity super ball mill fine dead burned magnesia, the improvement which comprises the steps of:
   (a) from 1 to 5% of a combination of at least two sodium silicates having a combined silica:soda ratio of about between 2 and 3.2 to 1,
   (b) from 1 to 5% of ball clay,
   (c) from 0.25 to 1% of sodium formate,
   tempering the batch with no more than about 8 parts, by weight, of water, based on the total dry solids in the batch.

8. The method of promoting hydration resistance in refractory specialty mixtures which include on the order of 10 to 40%, by weight, of super ball mill fine dead burned magnesia, which specialties include a combination of at least two sodium silicate powders having a combined $SiO_2$ to $Na_2O$ ratio between about 2:1 to 3.2:1, the improvement which comprises adding from 0.25 to about 1%, by weight, based on the total weight of the batch of sodium formate.

References Cited by the Examiner
UNITED STATES PATENTS

| | | | |
|---|---|---|---|
| 3,030,216 | 4/1962 | Chantler et al. | 106—59 |
| 3,075,848 | 1/1963 | Davies et al. | 106—58 |

TOBIAS E. LEVOW, *Primary Examiner.*

J. E. POER, *Assistant Examiner.*